US006192079B1

(12) United States Patent
Sharma et al.

(10) Patent No.: US 6,192,079 B1
(45) Date of Patent: Feb. 20, 2001

(54) METHOD AND APPARATUS FOR INCREASING VIDEO FRAME RATE

(75) Inventors: Ravi K. Sharma, Beaverton; Rajeeb Hazra, Tualatin; Arlene Kasai, Portland, all of OR (US)

(73) Assignee: Intel Corporation, Santa Clara, CA (US)

( * ) Notice: Under 35 U.S.C. 154(b), the term of this patent shall be extended for 0 days.

(21) Appl. No.: 09/074,556

(22) Filed: May 7, 1998

(51) Int. Cl.$^7$ ........................................... H04B 1/66
(52) U.S. Cl. ............................ 375/240.16; 375/240.29; 375/240.15
(58) Field of Search ..................... 348/416, 415, 348/411, 410, 409, 413, 699, 700, 701; 375/240.01, 240.02, 240.26, 240.27, 240.28, 240.29, 240.24, 240.12, 240.13, 240.15, 240.16

(56) References Cited

U.S. PATENT DOCUMENTS

| | | | |
|---|---|---|---|
| 5,546,130 | * | 8/1996 | Hackett et al. ........................ 348/699 |
| 5,596,420 | | 1/1997 | Daum . |
| 5,621,467 | * | 4/1997 | Chien et al. ........................ 348/409 |
| 5,717,463 | * | 2/1998 | Brailean et al. ..................... 348/416 |
| 5,995,154 | * | 11/1999 | Heimburger ........................ 348/448 |

OTHER PUBLICATIONS

PCT International Search Report for PCT/US99/05436.

* cited by examiner

*Primary Examiner*—Andy Rao
(74) *Attorney, Agent, or Firm*—Steven P. Skabrat

(57) ABSTRACT

Synthesizing of video frames that have been dropped by a video encoder is achieved by interpolating between decoded frames at a decoder. The method consists of successive refinement stages that increase in computational complexity. Starting with a spatio-temporal median filtering approach, each stage uses information that improves the quality of the interpolated frames, such as bit stream motion information, decoder-based motion estimation and motion-based state segmentation of regions. By using more computational resources, each of these stages results in an improved quality of interpolated video. The motion compensation techniques are based on block-based motion estimation of the kind used by block-transform based video encoders. More accurate motion estimates are obtained by using a combination of forward and backward block motion estimation. The method is further extended by incorporating global/local motion estimation based on the segmentation information, and employing image warping techniques to compensate for motion resulting from deformations.

34 Claims, 6 Drawing Sheets

FORWARD MOTION ESTIMATION

BACKWARD MOTION ESTIMATION

METHOD AND APPARATUS FOR INCREASING VIDEO FRAME RATE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field

The present invention relates generally to digital imaging and video systems and more specifically to video frame interpolation in video decoding processes.

2. Background Description

Video bit rate control mechanisms employed by digital video encoding and transmission systems (such as video teleconferencing systems, for example) often drop captured frames when encoding video data at low bitrates. This frame skipping may cause the video frame-rate to drop below the frame rate desired to perceive smooth motion, such as, for example, 25–30 frames per second (fps). As a result, low bit rate video may at times look jerky to the user. The jerkiness may be made more apparent by the inherent variability in video frame rates delivered by variable frame rate (VFR) control algorithms. One approach to rendering smooth motion in video transmitted at a low bit rate is to reconstruct or synthesize the dropped frames at the decoder by interpolating between successive encoded video frames. An objective of frame interpolation then is to display the decoded video at a higher frame rate compared with the encoded sequence, and perhaps at the original (i.e., capture) frame rate without having to increase the number of encoded bits. In other applications where the video frame rate is deemed acceptable, it may be possible to take advantage of frame interpolation at the decoder by encoding with a lower target frame rate, using the bits made available to improve spatial quality. Frame interpolation, therefore, is a powerful post-processing technique that may be used to improve perceived video quality and to differentiate decoding platforms in standards-based video telephony applications.

Contemporary low bit rate video compression techniques, such as the International Telecommunication Union-Telecommunication standardization section (ITU-T) H.263+ (ITU-T version 2 of Recommendation H.263) standard, are capable of compressing quarter common interchange format (QCIF) video at 10–15 fps at plain old telephone service (POTS) bit-rates (20–24 Kbits/sec), and common interchange format (CIF) video at about 10–15 fps at integrated services digital network (ISDN) bit-rates (84–128 Kbits/sec), at an acceptable video quality. Higher frame rates are typically not used because the overall video quality is degraded due to a lowering of the spatial quality. The decrease in spatial quality occurs when quality is sacrificed in order to make transmission bits available for the increased number of frames. Various frame interpolation techniques employed by a video decoder may be used to boost the frame rate to 20–30 fps for POTS and 20–30 fps for ISDN without increasing the number of encoded bits.

A simple approach to increasing video frame-rate is to insert repeated frames. A problem with this approach is that motion still appears discontinuous in a manner analogous to zero-order hold in data interpolation problems. Another simple approach is to synthesize the skipped frame by linear interpolation between two available adjacent frames. The synthesized frame is obtained by averaging temporally adjacent frames to the dropped frame. Such averaging may result in blurring of the moving regions and may give rise to "double exposure" artifacts when the motion between the frames is moderate to large. Due to the presence of the "double exposure" artifacts, averaging is generally considered to be an unacceptable solution to the frame interpolation problem.

To improve upon these simple techniques, some methods account for the object motion in the original frames. If object motion can be estimated, the frame interpolation process may use the motion information to obtain the motion trajectory of the object through the interpolated frame. If the estimated motion corresponds to the actual motion of objects in the frame, then it may be possible to obtain an accurate estimate of the dropped frame.

The quality of the interpolated frames and the complexity of the frame interpolation process depends at least in part on the particular motion estimation technique used and its ability to accurately predict object motion. In general, the more accurate the motion estimation, the more realistic the interpolation, usually at the expense of additional computational resources. Several frame interpolation techniques have been proposed in the prior art; virtually all of these processes use some type of motion estimation followed by frame synthesis based on the generated motion information and other ancillary information. The differences between these processes are in the details of the specific motion estimation technique used and the additional information used for frame synthesis.

Most of the lower complexity interpolation techniques use block-based motion estimation techniques similar to those used in motion compensated coding. As stated above, such techniques are inherently limited in their ability to capture complex types of object motion. To overcome the limitations of block-based motion estimation, some techniques have been proposed that use optical flow field-based motion. Optical flow field-based techniques are computationally expensive and have found little use in real-time video conferencing applications. As a compromise between the simplistic fixed block motion-based interpolation processes and the computationally intractable optical flow-based interpolation processes, researchers have employed techniques that find motion estimates of triangular patches formed by a triangular tessellation of the video. To better account for deformations, image warping-based techniques have also been utilized. These techniques estimate the interpolated frames by warping objects in one frame into the shape of the other frame.

The area of video frame interpolation remains an active area of research aided by the rapid improvement in computational resources in recent years. What is needed is a process that overcomes the deficiencies of the prior art and effectively increases the video frame rate.

SUMMARY

An embodiment of a method of increasing a video frame rate of a sequence of video frames in accordance with one invention is as follows. The method includes interpolating at least one frame between successive frames of the sequence by applying a spatio-temporal median filter to pixels of the two frames.

BRIEF DESCRIPTION OF THE DRAWINGS

The features and advantages of the present invention will become apparent from the following detailed description of the present invention in which.

DETAILED DESCRIPTION

In the following description, various aspects of a method and apparatus for increasing a video frame rate will be described. For purposes of explanation, specific numbers, systems and configurations are set forth in order to provide a thorough understanding of the present invention. However, it will also be apparent to one skilled in the art that the present invention may be practiced without the specific details. In other instances, well known features are omitted or simplified in order not to obscure the present invention.

An embodiment of the present invention comprises a video frame interpolation process that may be used with both raw (that is, uncompressed) and compressed video to increase the frame rate. The process is scaleable in terms of computational complexity and video quality, and consists of several stages in which the quality of the interpolated frames is incrementally improved. An appropriate number of stages may be used depending on the amount of processing power available at the receiver. The process is presented in a manner consistent with its development as a multi-stage process starting from spatio-temporal median filtering, which is subsequently refined by the use of temporal redundancy inherent in video sequences, and additional information estimated from the decoded video sequence.

Figure 1:
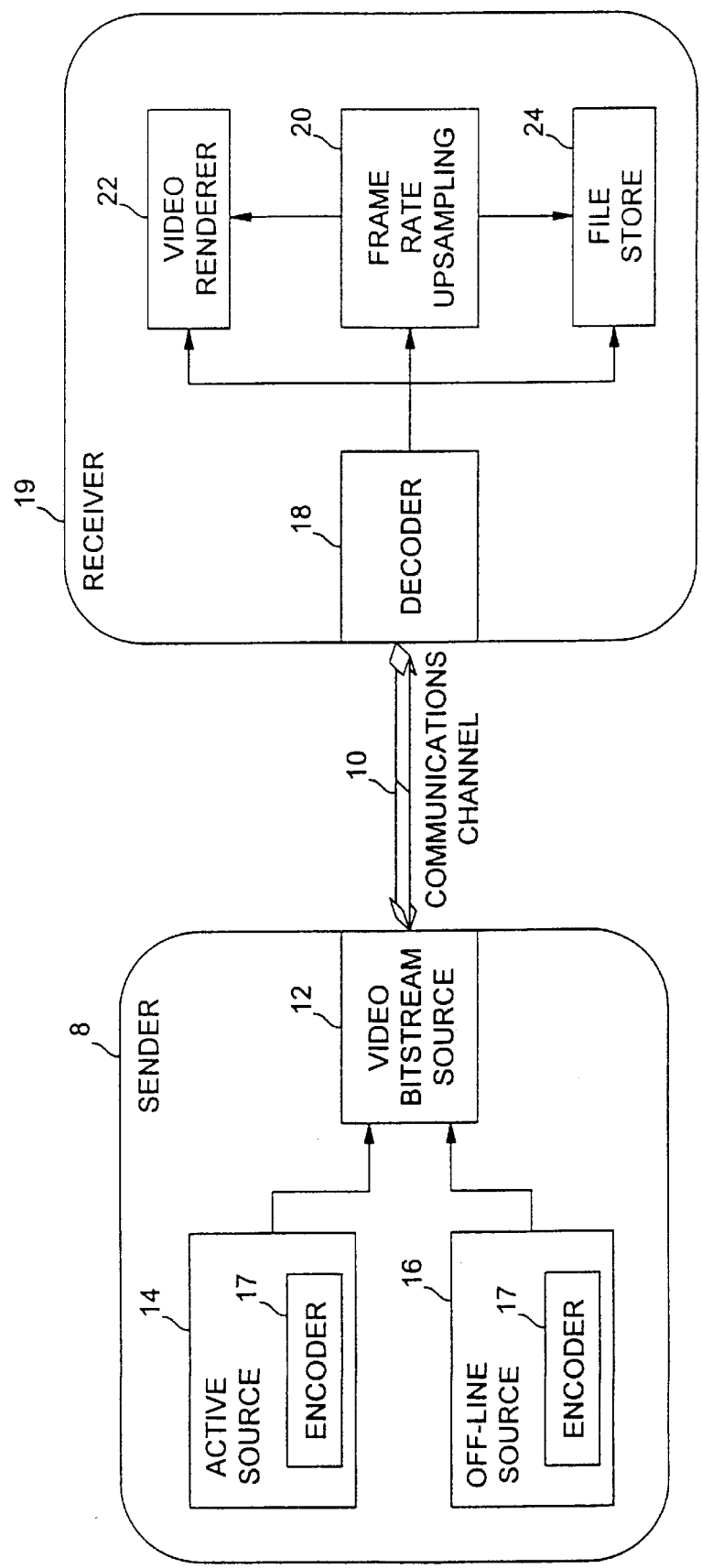
FIG. 1 is a high level block diagram of the system environment of an embodiment of the present invention.

FIG. 1 is a high level block diagram of the system environment of an embodiment of the present invention. Transmitting end 8 coupled to a communication channel 10 includes a video bit stream source 12. The video bit stream source takes video data signals from either an active source 14 or an off-line source 16 and transmits the video data signals over the communications channel 10. The active source 14 may comprise circuitry or a device to generate video data in real-time, such as a personal computer (PC), video camera, add-in circuit cards, or other electronic devices for the generation and compression of live content. In this embodiment, the active source is typically used in a system employing a conferencing model of operation. Off-line source 16 represents a stored file on a storage medium accessible locally or over a network, such as a local area network (LAN) or the Internet. In this embodiment, the off-line source is typically used in a system employing a streaming model of operation. Both the active source and off-line source include a video encoder 17 for encoding raw video data into a compressed format. In this embodiment, the communications channel 10 is one of POTS, network, Ethernet, ISDN, or local bus (for example, PCI, ISA, and the like) communications capabilities.

On a receiving end 19 coupled to the communications channel is a decoder 18. The decoder receives the encoded video data signals and decodes the signals into raw or decompressed video data signals. The video data signals are then processed by a frame rate upsampling (FRU) function 20. The output signals of the FRU are sent to a video renderer 22 for real-time display to a user or to file store 24 for future use. Alternatively, the output signals of the decoder 18 may be sent directly to video renderer 22 or file store 24 without frame rate upsampling processing. In some embodiments, the FRU 20 is integral with the decoder 18.

Embodiments of the present invention include methods and apparatus for implementing the FRU 20. One method of generating a higher frame rate is to generate a video frame (or frames) using the current and previous decoded frames from a video bit stream. One embodiment of the invention includes frame interpolation using spatio-temporal median filtering (as described below). The goal of frame interpolation is to generate a video frame (or frames) between the current and previous decoded frames from a video bit stream. Initially, a spatio-temporal median filter (STMF) is described that will be used as the basis for the evolution of the frame interpolation process of an embodiment of the present invention. Unlike frame averaging, a spatio-temporal median filter can capture small motions between the frames. In other embodiments, the spatio-temporal median filter is used in conjunction with motion information and state segmentation to improve the quality of the interpolated frames, albeit by using more computational resources.

The region of support for the spatio-temporal median filter comprises N pixel×M pixel regions at the same spatial locations in the current and previous frames, where N and M are positive integers. In one embodiment, N=M=3, although in other embodiments different values may be used and the region is not required to be square in shape. When N=M=3, the region of filter support defines a set of eighteen pixels, nine each in the current and previous frames. The output signal produced by the median filter is the median of these eighteen values. Since there are an even number of pixels, the median filter is biased to return the higher of the two central values.

Figure 2:
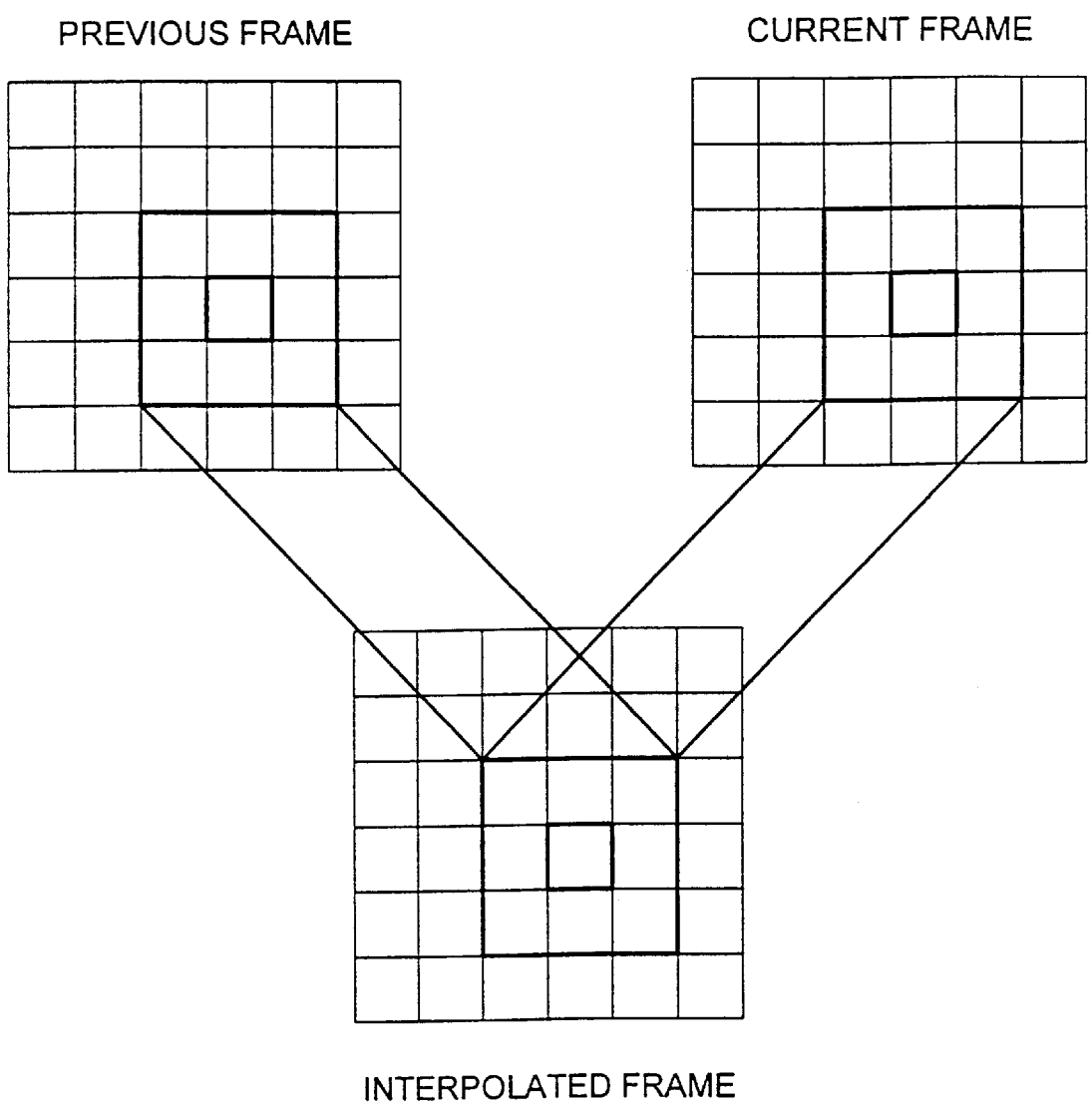
FIG. 2 is a diagram illustrating the use of a spatio-temporal median filter in an embodiment of the present invention.

FIG. 2 is a diagram illustrating the use of a spatio-temporal median filter in an embodiment of the present invention. The value of a pixel in the interpolated frame is given by the median value obtained by the spatio-temporal median operation, over a 3×3 region surrounding the spatially corresponding pixel locations in the previous and current frames. The STMF captures small object motions that are smaller than the support of the filter, wherein the support of the filter is the size of the region to which the filter is applied. In alternate embodiments, the size of the region may be increased (e.g., to 4×4, 5×5, 6×6, 7×7, 8×8, etc.). The spatio-temporal median filter is applied to pixel values of the luma plane only. In this embodiment, the chroma plane values in the interpolated frame are obtained by selecting the chroma values at the same spatial location in the previous or current frame which yields the median value for the luma plane. This ensures that the interpolated luma values and their corresponding chroma values belong to a corresponding physical object depicted within a frame.

Video sequences interpolated using the STMF tend to exhibit a flickering artifact, especially around sharp edges and other discontinuities in the video frames. This flicker is due to the fact that the median operation results in smoothing in the interpolated frames, whereas the non-interpolated frames of the video sequence are not smoothed. When the two types of frames are shown in quick succession, the smoothness difference manifests itself as a flickering artifact. To reduce this flicker, a median filter may be applied to the non-interpolated frames. The size of the region used to perform median filtering on the previous and current frames matches the size of a region used by the STMF in generating the pixels of the interpolated frames.

The spatio-temporal median filter is computationally more expensive than averaging, but is computationally cheaper than those methods that perform some type of motion estimation technique. In addition to capturing small motions, the spatio-temporal median filter also reduces coding artifacts such as blocking and ringing, while preserving the edges better than linear filters. This technique works well when the motion between the frames to be interpolated is small. When the motion is larger than the support size of the filter, the spatio-temporal median cannot capture the motion, and the interpolated frame will contain artifacts. In such cases, it is desirable to use other techniques to estimate motion before applying the spatio-temporal median filter.

Improving the performance of the spatio-temporal median filter may be accomplished by incorporating motion information into the frame interpolation process. The spatio-temporal median filter is applied after accounting for the motion of objects between the original video frames. Two techniques suitable for such for motion compensation are described below, although the invention is not limited in this respect.

The first technique is called motion compensation using bit stream motion information. This technique uses the motion vectors transmitted as part of the video bit stream received from the sender (hence, it only works with compressed video data). Several video compression techniques, including those based on standards such as H.263+ and Motion Picture Expert Group (MPEG), perform inter-frame motion estimation at the encoder for motion compensated coding. The most popular motion estimation techniques are block-based motion estimation processes. Motion estimation is performed on a per block or macro-block basis, where a block comprises an 8 pixel×8 pixel region and a macro-block comprises a 16 pixel×16 pixel region. For each block or macro-block in the current frame, the best matching block or macro-block is found in the previous frame. A motion vector between the two represents the estimate of motion. The encoder transmits the motion vectors as part of the video bit stream, which are then used to reconstruct video frames at the decoder. These encoded motion vectors are also used to generate interpolated frames.

In this embodiment, for each block in the current frame, a motion vector $(M_x, M_y)$ is obtained from the bit stream. This motion vector gives the location of the best matching block in the previous frame (e. g., a forward motion vector). The best matching block may be obtained according to a predetermined correlation measure. Assuming the trajectory of motion of the blocks to be linear between frames, this block should appear in the interpolated frame at a location given by the vector $(d \times M_x, d \times M_y)$, from the location in the current frame, where d is given by $d=k/(N+1)$, $k=1 \ldots N$, where N is the number of frames to be interpolated between the current and previous decoded frames (N being a positive integer).

Figure 3:
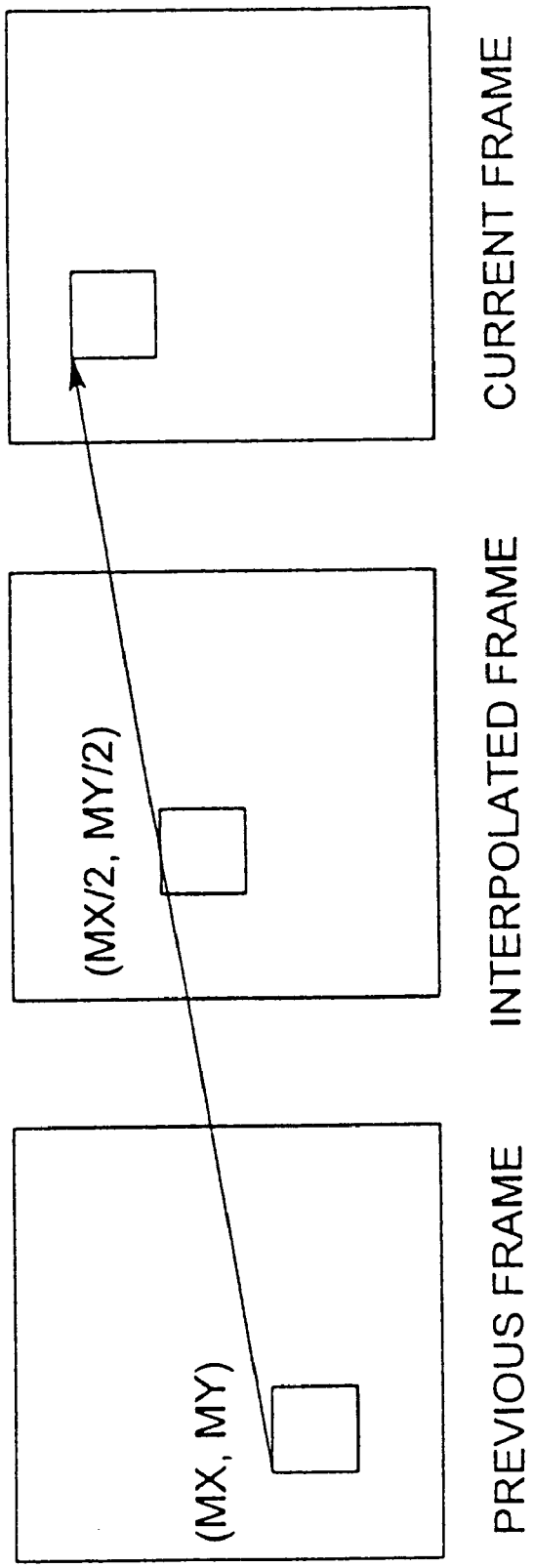
FIG. 3 is a diagram showing motion compensation using bit stream motion information of an embodiment of the present invention.

The block at this location in the interpolated frame is obtained by applying the spatio-temporal median filter to the block in the current frame and the block at $(M_x, M_y)$ in the previous frame. The spatio-temporal median operation now compensates for remaining small motions that are not captured by the block motion estimates. For pixels that are at the border of a block, the spatio-temporal median operation is replaced by a simple average of spatially corresponding pixels between the previous current frames. FIG. 3 is a diagram illustrating motion compensation using bit stream motion information.

In this embodiment, the above process is repeated for all blocks in the current frame to obtain the interpolated frame. The interpolated frame will usually contain holes in the regions through which no motion vectors pass. Pixels in the interpolated frame that are holes are filled by averaging the pixels at corresponding spatial locations in the current and previous frames.

The quality of interpolated frames in this embodiment depends on the accuracy of the bit stream motion vectors. In this context, motion estimation, in general, has a different objective than the corresponding objective in motion compensated coding. In motion compensated coding, motion estimation may be used to reduce the entropy of the frame difference without strict regard to whether the motion field actually corresponds to true object motion in the frame or not. In frame interpolation, on the other hand, an objective of motion estimation is to estimate the actual object motion for interpolation. The two objectives are, in general, difficult to satisfy simultaneously. As a result, satisfying both objectives does not always correspond to the correct object motion. Motion estimation at the encoder is also biased towards zero motion vectors, to reduce the amount of information to be coded. In addition, the bit stream motion vectors match blocks from the current frame to the previous frame (known as forward motion estimation). Forward motion estimation alone is typically not sufficient to accurately estimate motion when there are situations such as occlusions and zooming. Due to these difficulties, using the bit stream motion vectors may result in interpolation artifacts due to badly matched blocks and excessive holes. Therefore, a second technique for interpolation that comprises performing motion estimation on the decoded frames at the decoder is also used.

To improve upon the quality of interpolated frames, improvement of the motion estimation beyond that provided by the encoder may be needed. Although it may sometimes be possible to modify the motion estimation at the encoder to suit the needs of frame interpolation at the decoder, this may not always be feasible. Therefore, motion estimation may be carried out at the receiver of encoded video frames, e.g., at the decoder or other receiving device such as the frame rate upsampling device, to better implement frame interpolation. This improvement in quality is possible at the expense of computational complexity and processing power at the decoder.

There are several advantages in performing motion estimation at the decoder. First, there are no restrictions on the size of the blocks and the length of the motion vectors as in a standards-compliant encoder. Smaller blocks can be used for more accurate estimation of motion, whereas larger motion vector sizes can enable estimation of large motion. Second, the coding biases (such as a preference for using the zero motion vectors to reduce the number of motion vector bits to be coded) do not have to be taken into account, thereby providing a better estimation of object motion. Frequently, just the forward motion vectors are available from the video bit stream. Using forward motion vectors alone can result in blocking artifacts due to mismatched blocks and holes due to unmatched blocks. To overcome the limitations of forward motion estimation, in one embodiment of the present invention, both forward and backward motion estimation may be performed at the decoder.

Figure 4:
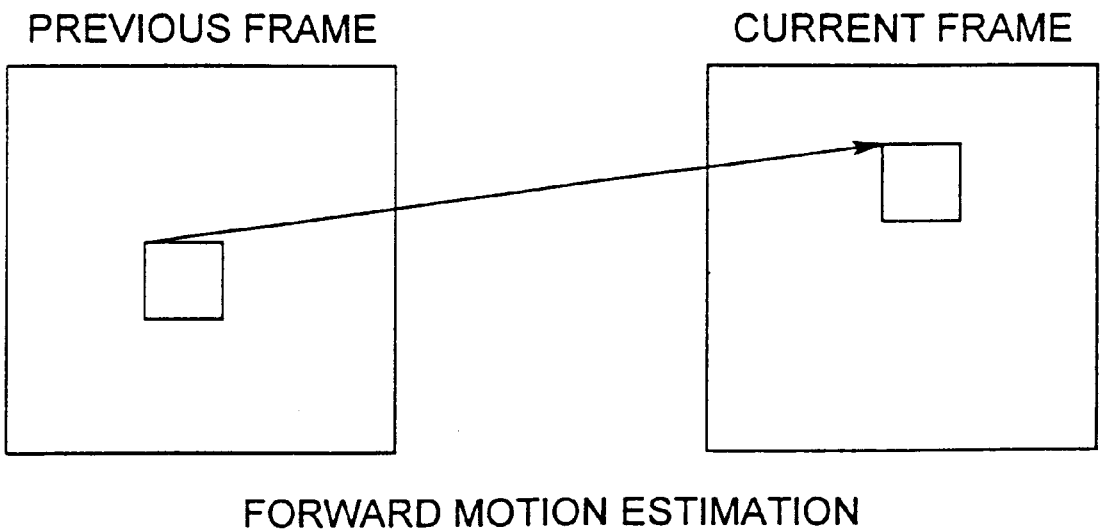
FIGS. 4 and 5 are diagrams illustrating forward and backward motion estimation of an embodiment of the present invention.
Figure 5:
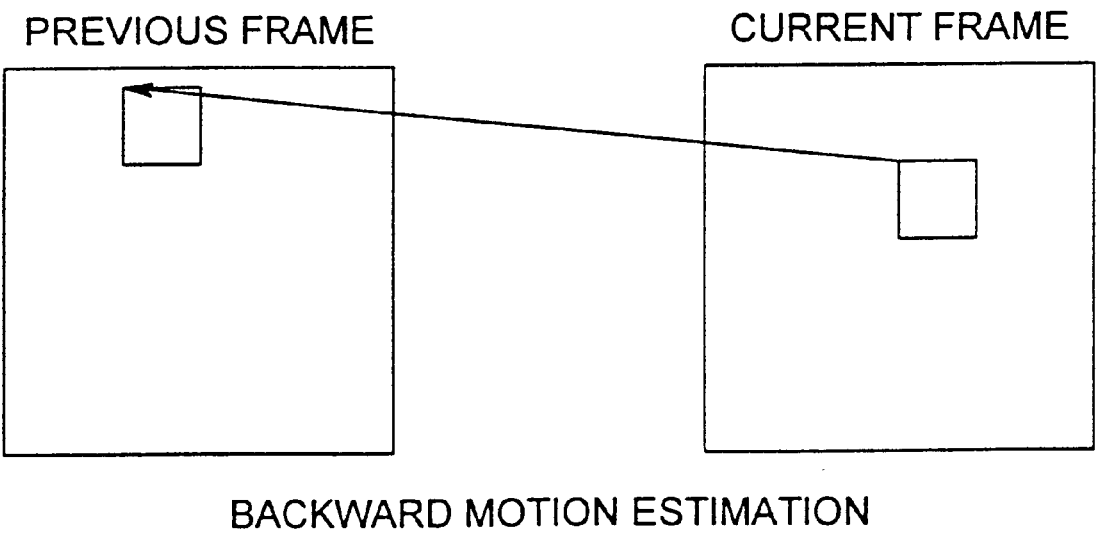

FIGS. 4 and 5 are diagrams illustrating forward and backward motion estimation. In forward motion estimation as shown in FIG. 4, each block in the current decoded frame is assigned a motion vector by finding the best matching block in the previous decoded frame. In this embodiment, an exhaustive search for the best matching block is performed by using the sum of absolute differences (SAD) between the pixel values as an error measure. The block in the previous frame with the smallest SAD is chosen as the best matching block. In backward motion estimation as shown in FIG. 5, each block in the previous decoded frame is assigned a motion vector by finding the best matching block in the current decoded frame. The search strategy is similar to that used for forward motion estimation.

The construction of the interpolated frame is similar to the embodiment described above. However, both the forward and backward estimates of motion are now used. At each pixel either the forward or the backward motion vector is selected, depending on which of the two estimates yield the minimum SAD. This selection ensures that at each pixel, the best estimate of motion, whether forward or backward, is used for interpolation. The interpolation is performed by using the selected motion vectors and by applying the spatio-temporal median filter as in the previously described embodiment.

Utilizing both forward and backward motion estimation results in the improved quality of interpolated frames. The improvement in quality is possible at the expense of computational complexity and processing power in the decoder. When computational resources are limited, the backward motion estimation processing may be omitted, but this may result in a poor quality of interpolated frames in cases such as zooming.

The spatio-temporal median filter results in a smoothing of the interpolated frames. This causes objects to appear blurred, especially when the object size is comparable to the size of the filter. Since the task of the spatio-temporal median filter is to compensate small motions, it need not be applied to regions that do not contain any motion. To identify the regions to which the spatio-temporal median filter should be applied, a two-state segmentation may be performed. The state segmentation scheme is pixel-based. Regions are portions of the video image without any specific associated geometry. This segmentation divides the regions in the current and previous frames into regions that have changed due to motion and the regions that are unchanged. This classification into changed and unchanged regions is obtained by applying a threshold operation to the pixel-wise differences between the current and previous frames. The spatio-temporal median filter is then applied to those regions that have changed between the frames. This prevents the blurring of regions that haven't moved between the frames. The interpolated video may still contain some flicker. To reduce this flicker, it is now sufficient to apply a median filter to those regions that have changed in the non-interpolated frames. The size of the filter matches that used for STMF as described above.

The quality of the interpolated frames can be improved further if information about occlusions, uncovered background and scene changes can be obtained. In this embodiment, to obtain this information, regions in the decoded video frames may be segmented into five states—stationary, moving, covered background, uncovered background and changed scene. This state segmentation scheme uses three decoded frames—the current decoded frame, the previous decoded frame and the previous to previous frame. The five state segmentation is obtained by using two two-state (changed-unchanged) segmentations. The first two-state segmentation is performed between the current and previous frame and the second between the previous and previous to previous frames.

The five-state segmentation is then used to construct the interpolated frames. In case of a scene change, the interpolated frame is formed by repeating the previous decoded frame. Stationary pixels are interpolated by averaging between the current and previous frames. Covered pixels are interpolated by selecting from the current frame. Uncovered pixels are interpolated by selecting from the previous frame. Moving pixels are interpolated by spatio-temporal median filtering on the spatially corresponding motion compensated pixels from the current and previous frames.

Incorporating the knowledge of a semantic segmentation of the video frames into the interpolation process increases the coherence of the interpolated regions in terms of objects. This reduces the artifacts in the interpolated frames. The state segmentation can also be used to improve motion estimation, by including knowledge about covered, uncovered and moving regions into the motion estimation process.

An embodiment of the present invention comprises a process for synthesizing video frames that have been dropped at the video encoder by interpolating between the decoded frames at the decoder. The process comprises successive refinement stages that increase in computational complexity. Starting with a spatio-temporal median filtering approach, each stage uses information that benefits the interpolation process such as bit stream motion information, decoder-based motion estimation and motion-based state segmentation of regions. Each of these stages result in improved quality of interpolated video. The motion compensation techniques are based on block-based motion estimation. Although block motion estimation gives a coarse approximation of the motion, it is computationally cheaper than more sophisticated motion estimation techniques. Improved motion estimates are obtained by using a combination of forward and backward block motion estimation. The process is further extended by incorporating global/local motion estimation based on the segmentation information, and employing image warping techniques to compensate for motion resulting from deformations.

Figure 6:
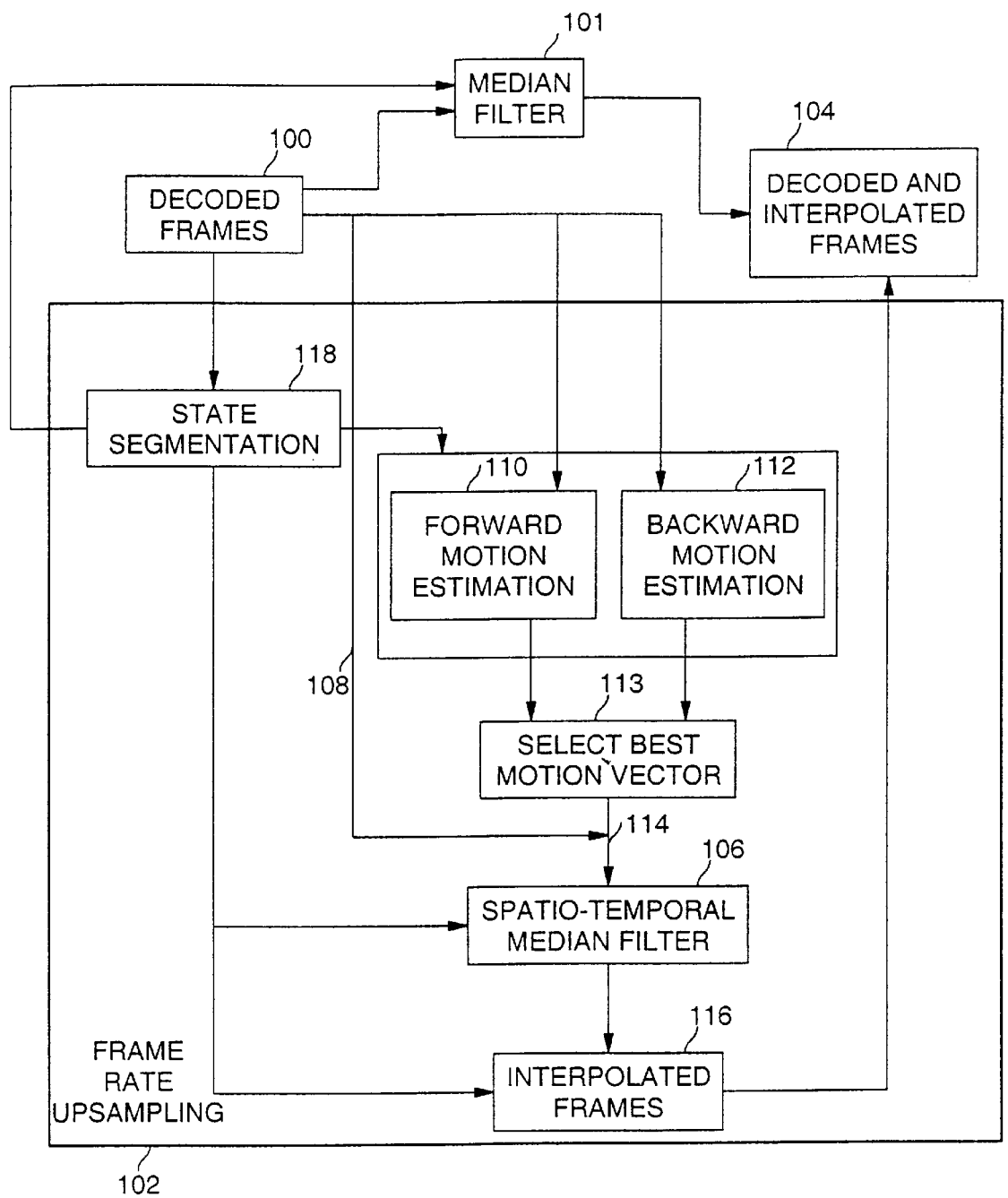
FIG. 6 is a diagram of a method for increasing frame rate according to an embodiment of the present invention.

FIG. 6 is a diagram of a method for increasing video frame rate according to an embodiment of the present invention. Decoded frames 100 are received from a decoder (not shown). The decoded frames are input to frame rate upsampling device 102 to produce a video bit stream 104 having interpolated frames interspersed with decoded frames. In one embodiment of the present invention, the decoded frames are input directly to spatio-temporal median filter 106 via line 108. In another embodiment of the present invention, the decoded frames are first input to forward motion estimation process 110 and backward motion estimation process 112. The output data signals of the motion estimation processes are analyzed to select a best motion vector 113. The best motion vector may be selected according to a predetermined correlation measure. The motion vector is input to spatio-temporal median filter 106 via line 114. In either embodiment, the spatio-temporal median filter outputs interpolated frames 116, which are combined with decoded frames 100 to form video bit stream 104. In a further embodiment, decoded frames 100 are input to state segmentation operation 118, which provides state information to the motion estimation operation, the spatio-temporal median filter, and the resulting interpolated frames 116. Further, state segmentation 118 provides state information to median filter 101. Median filter operates on non-interpolated frames (from decoded frames 100) to reduce flicker in the resulting video bit stream comprising decoded and interpolated frames 104.

Figure 7:
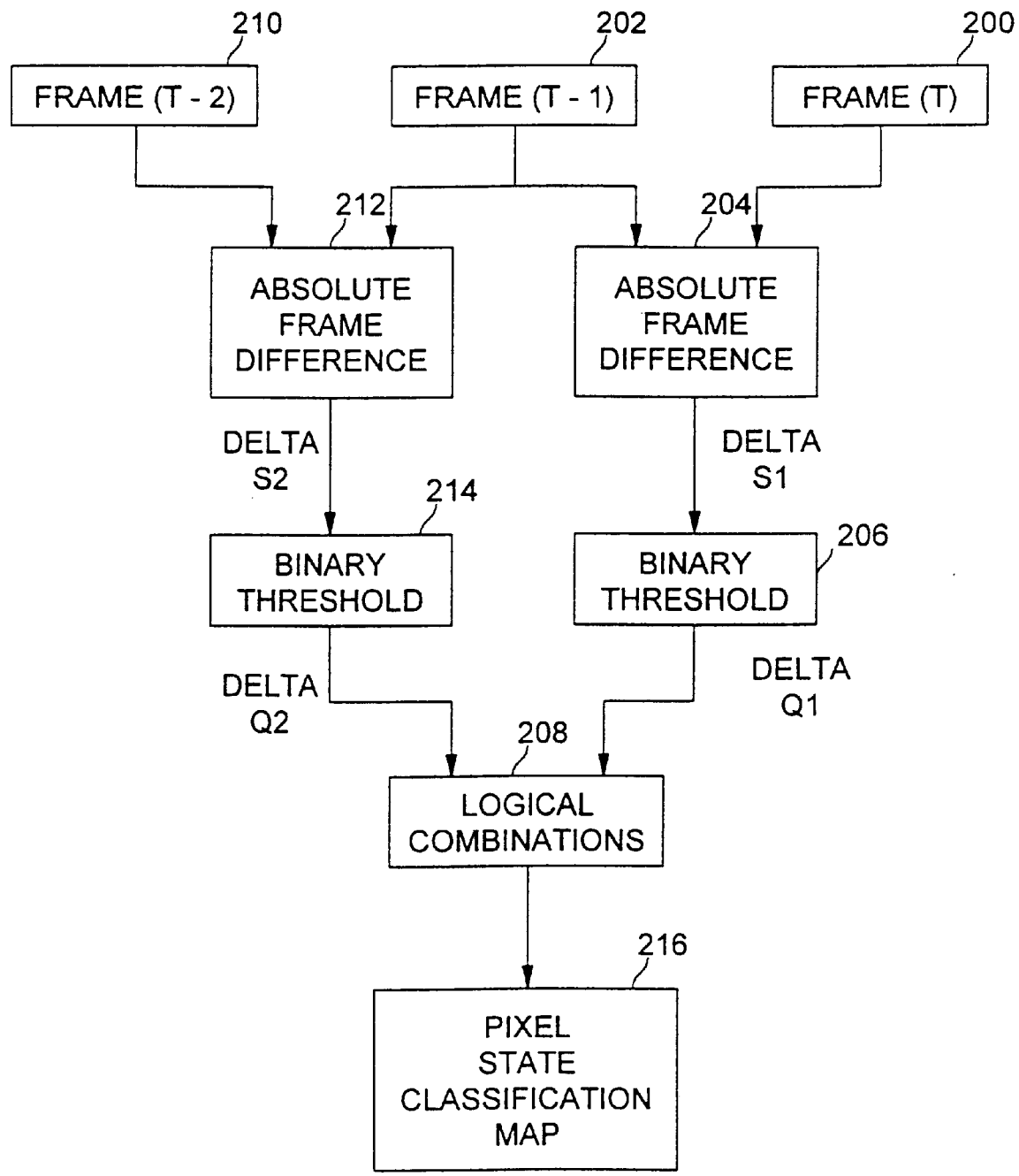
FIG. 7 is a flow diagram for classifying pixels into states according to a state segmentation operation according to an embodiment of the present invention.

FIG. 7 is a flow diagram for classifying pixels into states according to a state segmentation function 118. A current frame (t) 200 is compared to a previous frame (t−1) 202 to produce a first absolute frame difference 204. The absolute frame difference, also called $\Delta S_1$ is input to binary threshold operation 206. The first threshold indicator $\Delta Q_1$ is input to logical combination operation 208. In a similar manner, previous frame (t−1) 202 is compared to a previous to the previous frame (t−2) 210 to produce a second absolute frame difference 212. This absolute frame difference, also called $\Delta S_2$ is input to binary threshold operation 214. The second threshold indicator $\Delta Q_2$ is also input to logical combination operation 208. The output of the logical combination operation 208 is pixel state classification map 216.

The pixel state classification map holds the state information for each pixel. The pixel state classification map is used by motion estimation functions 110, 112, and spatio-temporal median filter operation 106. The state or class for each pixel is determined according to Table I.

TABLE I

| Pixel State | Logical Combinations |
|---|---|
| Changed | $\Delta Q_1 = 1$ |
| Unchanged | $\Delta Q_1 = 0$ |
| Stationary | $\Delta Q_1 = 0$ AND $\Delta Q_2 = 0$ |
| Moving | $\Delta Q_1 = 1$ AND $\Delta Q_2 = 1$ |
| Covered | $\Delta Q_1 = 0$ AND $\Delta Q_2 = 1$ |
| Uncovered | $\Delta Q_1 = 1$ AND $\Delta Q_2 = 0$ |

One embodiment of a process for performing integer pixel motion estimation of forward motion estimation 110 and backward motion estimation 112 of FIG. 5 is shown in pseudo-code in Table II. Forward motion estimation processing is shown as an example; for backward motion estimation, the previous luma frames and the current luma frames are exchanged in the process.

TABLE II

© 1998 Intel Corporation
Inputs:
    1. Previous Luma Frame is a two dimensional array of pixels
    2. Current Luma Frame is a two dimensional array of pixels
    3. Block Size is an integer of the size of a block
    4. Frame Height is an integer of the height of the frame
    5. Frame Width is an integer of the width of the frame
    6. Search Area(Pixels) is an integer of the size in pixels of the search area
Outputs:
    1. Motion Vectors is a two dimensional array of motion vectors
    2. Sum of Absolute Differences is a two dimensional array of sums of absolute difference
Begin
    Calculate the number of block rows and columns from Frame Height, Frame Width, and Block Size.
    Expand the boundaries of the Previous Luma Frame by Block Size pixels on each side by replicating pixels on the edges.
    For each Block Size X Block Size block [i, j] in the Current Luma Frame loop
        Minimum Sum of Absolute Differences = Maximum Integer.
        Compute Sum of Absolute Differences.
        If Current Sum of Absolute Differences < Minimum Sum of Absolute Differences then
            Minimum Sum of Absolute Differences = Current Sum of Absolute Differences.
            Computer Linear Motion Vectors and store in Motion Vectors [i, j].
        End If
    End loop
End When the motion vectors are known for both forward motion estimation and backward motion estimation, the best motion vector is selected, the spatio-temporal median filter is applied and holes in the interpolated frame are filled. Table III shows an embodiment of these operations implemented in pseudo-code.

TABLE III

© 1998 Intel Corporation
Inputs:
    1. Previous Frame (Y, Cr, Cb) are arrays of luma and chroma values
    2. Current Frame (Y, Cr, Cb) are arrays of luma and chroma values
    3. Forward Motion Vector Array is a two dimensional array of forward motion vectors
    4. Backward Motion Vector Array is a two dimensional array of backward motion vectors
    5. Sum of Absolute Differences Array is an array of Sum of Absolute Differences
    6. State Classification Map is an array of the states for each pixel
    7. Block Size is an integer of the size of a block
    8. Frame Height is an integer of the height of the frame
    9. Frame Width is an integer of the width of the frame
Outputs:
    1. Interpolated Frame (Y, Cr, Cb) are arrays of luma and chroma values
Begin
    For each Block Size X Block Size block in Interpolated Frame Y array loop
        For each pixel in the block loop
            case pixel state in State Classification Map:
            "Moving":
                If motion vector exists (either backward, forward, or both) then
                Select motion vector from Backward Motion Vector Array and Forward Motion Vector Array using the minimum Sum of Absolute Differences.
                Perform Spatio-temporal median filter using 3X3 window on pixels from the Previous Frame Y array and the Current Frame Y array.
                Assign median value to pixel in Interpolated Frame Y array.
                Select Cr, Cb values for median luma candidate
                Assign selected Cr, Cb values to pixels in Interpolated Frame Cr and Cb arrays.
                Else
                Assign pixel in Interpolated Frame Y array to (Previous Frame Y array pixel + Current Frame Y array pixel)/2.
                Assign pixel in Interpolated Frame Cr array to (Previous Frame Cr array pixel + Current Frame Cr array pixel)/2.
                Assign pixel in Interpolated Frame Cb array to (Previous Frame Cb array pixel + Current Frame Cb array pixel)/2.
                End If
            "Stationary":
            "Uncovered":
                Assign pixel in Interpolated Frame Y array to pixel in Previous Frame Y array.
                Assign pixel in Interpolated Frame Cr array to pixel in Previous Frame Cr array.
                Assign pixel in Interpolated Frame Cb array to pixel in Previous Cb array.
            "Covered":
                Assign pixel in Interpolated Frame Y array to pixel in Current Frame Y array.
                Assign pixel in Interpolated Frame Cr array to pixel in Current Frame Cr array.
                Assign pixel in Interpolated Frame Cb array to pixel in Current Frame Cb array.
            End case
        End loop
    End loop
End While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of increasing a video frame rate of a sequence of video frames comprising:

interpolating at least one frame between a first frame and a second frame of the sequence by applying a spatio-temporal median filter to pixel signal values of the first and second frames, wherein output signals of the spatio-temporal median filter comprise a median signal value of the pixels of spatially corresponding regions in the first and second frames and a pixel having the median signal value.

2. The method of claim 1, wherein the second frame is a current frame of the sequence and the first frame is a previous frame of the sequence, immediately preceding the current frame.

3. The method of claim 2, further comprising repeating the interpolating for all successive first and second frame combinations.

4. The method of claim 1, wherein applying the spatio-temporal median filter comprises operating on corresponding regions of pixel signal values in the first and second frames.

5. The method of claim 1, wherein the median signal value is the higher of two central values when the number of pixels in the spatially corresponding regions in the first and second frames is even.

6. The method of claim 5, wherein applying the spatio-temporal median filter comprises applying the spatio-temporal median filter to pixel signal values of a luma plane of the first and second frames and assigning the median signal value of the regions to a pixel in the interpolated frame.

7. The method of claim 6, further comprising obtaining a signal value from a chroma plane for the pixel having the median signal value and assigning the chroma signal value to the pixel in the interpolated frame.

8. The method of claim 1, further comprising:

determining a first set of regions in the first and second frames that have changed due to motion of objects represented in the first and second frames and a second set of regions in the first and second frames that have not changed; and applying the spatio-temporal median filter to the first set of regions.

9. The method of claim 8, wherein determining the first set of regions comprises applying a threshold operation to pixel-wise differences between corresponding pixels of the first and second frames.

10. A method of increasing a video frame rate of a sequence of video frames comprising:

determining motion of objects in blocks of the sequence of video frames by applying motion compensation using motion vectors received as part of the sequence;

creating at least one block of an interpolated frame between a first frame and a second frame by applying a spatio-temporal median filter to pixels of best matching blocks of the first and second frames as determined by the motion compensation; and averaging pixels at the same spatial location in the first and second frames for regions of pixels in the interpolated frame through which no motion vectors pass.

11. The method of claim 10, further comprising, for pixels at a border of the block, averaging spatially corresponding pixels in the first and second frames.

12. In a decoder, a method of increasing a video frame rate of a sequence of video frames comprising:

determining motion of objects in the sequence of video frames by applying motion compensation with at least one of forward motion estimation and backward motion estimation to the sequence of video frames received by the decoder;

selecting motion vectors from blocks of a first frame to blocks of a second frame based on the motion compensation;

creating at least one block of at least one interpolated frame between the first and second frames by applying a spatio-temporal median filter to best matching blocks of the first and second frames as determined by the selected motion vectors;

wherein pixels of the first and second frames are selected for creation of the at least one interpolated block based at least in part on segmentation states of pixels of the blocks, the segmentation states resulting from generation of a pixel state classification map by applying binary threshold operations over the frames.

13. The method of claim 12, wherein the motion compensation comprises both forward motion estimation and backward motion estimation.

14. The method of claim 12, further comprising determining the best matching blocks according to an error measure comprising sums of absolute differences of pixel values in the first and second frames.

15. The method of claim 14, further comprising selecting a forward motion vector for each pixel in the block when the forward motion vector yields a minimum sum of absolute differences for the block.

16. The method of claim 14, further comprising selecting a backward motion vector for each pixel in the block when the backward motion vector yields a minimum sum of absolute differences for the block.

17. The method of claim 12, further comprising:

determining a first set of regions in the first and second frames that have changed due to motion of objects represented in the first and second frames and a second set of regions in the first and second frames that have not changed; and applying the spatio-temporal median filter to the first set of regions.

18. The method of claim 17, wherein determining the first set of regions comprises applying a threshold operation to pixel-wise differences between corresponding pixels of the first and second frames.

19. An apparatus for increasing a video frame rate of a sequence of video frames comprising:

a frame rate upsampling device to interpolate at least one frame between a first frame and a second frame of the sequence by applying a spatio-temporal median filter to pixels of the first and second frames, wherein output signals of the spatio-temporal median filter comprise a median signal value of the pixels of spatially corresponding regions in the first and second frames and a pixel having the median signal value.

20. The apparatus of claim 19, wherein the median signal value is the higher of two central values when the number of pixels in the corresponding regions in the first and second frames is even.

21. The apparatus of claim 19, wherein the frame rate upsampling device further comprises:

means for determining a first set of regions in the first and second frames that have changed due to motion of objects represented in the first and second frames and a second set of regions in the first and second frames that have not changed; and means for applying the spatio-temporal median filter to the first set of regions.

22. The apparatus of claim 19, wherein the determining means comprises means for applying a threshold operation to pixel-wise differences between corresponding pixels of the first and second frames to determine the first set of regions.

23. An apparatus for increasing a video frame rate of a sequence of video frames comprising:

a motion compensator to determine motion of objects in blocks of the sequence of video frames by applying motion compensation operations using motion vectors received as part of the sequence;

a spatio-temporal median filter to create blocks of at least one interpolated frame between a first frame and a second frame by applying a spatio-temporal median filter operation to pixels of best matching blocks of the first and second frames as determined by the motion compensator; and a state segmentation unit coupled to the spatio-temporal median filter to select pixels of the first and second frames for generation of the interpolated blocks based at least in part on segmentation states of the blocks, the segmentation states resulting from generation of a pixel state classification map by applying binary threshold operations over the frames.

24. In a decoder, an apparatus for increasing a video frame rate of a sequence of video frames comprising:

a motion compensator to determine motion of objects in the sequence of video frames by applying motion compensation with at least one of forward motion estimation and backward motion estimation to the sequence of video frames received by the decoder;

a motion vector selector to select motion vectors from blocks of a first frame to blocks of a second frame based on the motion compensation;

a spatio-temporal median filter to create blocks of at least one interpolated frame between the first and second frame by applying a spatio-temporal median filter operation to best matching blocks of the first and second frames as determined by the selected motion vectors;

a state segmentation unit coupled to the spatio-temporal median filter to select pixels of the first and second frames for generation of the interpolated blocks based at least in part on segmentation states of the blocks, the segmentation states resulting from generation of a pixel state classification map by applying binary threshold operations over the frames.

25. An apparatus for increasing a video frame rate of a sequence of video frames comprising:

means for determining motion of objects in blocks of the sequence of video frames by applying motion compensation using motion vectors received as part of the sequence;

means for creating blocks of at least one interpolated frame between a first frame and a second frame by applying a spatio-temporal median filter to pixels of best matching blocks of the first and second frames as determined by the motion compensation; and means for selecting pixels of the first and second frames for generation of the interpolated blocks based at least in part on segmentation states of the blocks, the segmentation states resulting from generation of a pixel state classification map by applying binary threshold operations over the frames.

26. In a decoder, an apparatus for increasing a video frame rate of a sequence of video frames comprising:

means for determining motion of objects in the sequence of video frames by applying motion compensation with at least one of forward motion estimation and backward motion estimation to the sequence of video frames received by the decoder;

means for selecting motion vectors from blocks of a first frame to blocks of a second frame based on the motion compensation;

means for creating blocks of at least one interpolated frame between the first and second frame by applying a spatio-temporal median filter operation to best matching blocks of the first and second frames as determined by the selected motion vectors; and means for selecting pixels of the first and second frames for generation of the interpolated blocks based at least in part on segmentation states of the blocks, the segmentation states resulting from generation of a pixel state classification map by applying binary threshold operations over the frames.

27. The method of claim 1, further comprising selecting pixels of the first and second frames for generation of the interpolated frame based at least in part on segmentation states of regions of the frames, the regions including the pixels.

28. The method of claim 27, wherein the segmentation states comprise at least stationary, moving, covered, and uncovered states.

29. The method of claim 10, further comprising selecting pixels of the first and second frames for generation of the interpolated block based at least in part on segmentation states of the blocks.

30. The method of claim 29, wherein the segmentation states comprise at least stationary, moving, covered, and uncovered states.

31. The method of claim 12, wherein the segmentation states comprise at least stationary, moving, covered, and uncovered states.

32. The apparatus of claim 19, wherein the frame rate upsampling device selects pixels of the first and second frames for generation of the interpolated frame based at least in part on segmentation states of regions of the frames, the regions including the pixels.

33. The apparatus of claim 32, wherein the segmentation states comprise at least stationary, moving, covered, and uncovered states.

34. The apparatus of claim 23, wherein the segmentation states comprise at least stationary, moving, covered, and uncovered states.

* * * * *